United States Patent
Pickelsimer et al.

(10) Patent No.: US 9,071,729 B2
(45) Date of Patent: Jun. 30, 2015

(54) PROVIDING USER COMMUNICATION

(75) Inventors: Lisa A. Pickelsimer, Atlanta, GA (US);
Mark Gathen, Atlanta, GA (US);
Joshua Musick, Brooklyn, NY (US);
Robert Fabricant, Brooklyn, NY (US);
David Werner, San Francisco, CA (US);
Andrew Zeldis, Brooklyn, NY (US)

(73) Assignee: Cox Communications, Inc., Atlanta, GA (US)

(*) Notice: Subject to any disclaimer, the term of this patent is extended or adjusted under 35 U.S.C. 154(b) by 885 days.

(21) Appl. No.: 11/651,140

(22) Filed: Jan. 9, 2007

(65) Prior Publication Data

US 2008/0168506 A1    Jul. 10, 2008

(51) Int. Cl.

| | |
|---|---|
| H04N 5/445 | (2011.01) |
| H04N 7/173 | (2011.01) |
| H04N 7/16 | (2011.01) |
| G06F 3/00 | (2006.01) |
| G06F 13/00 | (2006.01) |
| G06Q 10/10 | (2012.01) |
| G06Q 30/02 | (2012.01) |
| H04N 21/25 | (2011.01) |
| H04N 21/466 | (2011.01) |
| H04N 21/4788 | (2011.01) |
| H04N 21/482 | (2011.01) |
| H04H 60/80 | (2008.01) |

(52) U.S. Cl.
CPC ............ *H04N 7/17318* (2013.01); *G06Q 10/10* (2013.01); *G06Q 30/02* (2013.01); *H04N 21/252* (2013.01); *H04N 21/4668* (2013.01); *H04N 21/4788* (2013.01); *H04N 21/4826* (2013.01); *H04H 60/80* (2013.01)

(58) Field of Classification Search
USPC ........................................ 725/61, 112, 141
See application file for complete search history.

(56) References Cited

U.S. PATENT DOCUMENTS

| | | |
|---|---|---|
| 5,565,909 A | 10/1996 | Thibadeau et al. |
| 5,583,560 A | 12/1996 | Florin et al. |
| 5,808,662 A | 9/1998 | Kinney et al. |
| 5,812,123 A | 9/1998 | Rowe et al. |
| 5,818,439 A | 10/1998 | Nagasaka et al. |
| 5,861,906 A | 1/1999 | Dunn et al. |
| 6,144,375 A | 11/2000 | Jain et al. |
| 6,188,398 B1 | 2/2001 | Collins-Rector et al. |

(Continued)

FOREIGN PATENT DOCUMENTS

JP        2002218428 A  *  8/2002  ............. H04N 7/173

OTHER PUBLICATIONS

Copending U.S. Appl. No. 12/545,099, filed Aug. 21, 2009 entitled "Providing a Video User Interface".

(Continued)

*Primary Examiner* — Ricky Chin
(74) *Attorney, Agent, or Firm* — Merchant & Gould

(57) ABSTRACT

Systems and methods are disclosed for providing user communication. First an invitation input may be received from a first user. The invitation input may comprise a recommendation to a second user to take an action regarding content to be delivered over a content delivery system. Then, the invitation input may be transmitted to the second user. Next, an acceptance input may be received from the second user. The acceptance input may comprise an acceptance to the invitation input. The acceptance input may then be transmitted to the first user in response to receiving the acceptance input.

19 Claims, 4 Drawing Sheets

(56) References Cited

U.S. PATENT DOCUMENTS

| | | |
|---|---|---|
| 6,282,713 B1 | 8/2001 | Kitsukawa et al. |
| 6,438,579 B1 | 8/2002 | Hosken |
| 6,615,248 B1 | 9/2003 | Smith .......................... 709/217 |
| 6,754,904 B1 | 6/2004 | Cooper et al. |
| 6,934,963 B1 | 8/2005 | Reynolds et al. ............... 725/39 |
| 6,968,364 B1 | 11/2005 | Wong et al. |
| 6,983,426 B1 | 1/2006 | Kobayashi et al. |
| 7,017,173 B1 | 3/2006 | Armstrong et al. |
| 7,080,139 B1* | 7/2006 | Briggs et al. .................. 709/224 |
| 7,228,305 B1 | 6/2007 | Eyal et al. |
| 7,246,367 B2 | 7/2007 | Livonen |
| 7,249,366 B1 | 7/2007 | Flavin |
| 7,272,844 B1 | 9/2007 | Bankers et al. |
| 7,290,211 B2 | 10/2007 | Goodwin et al. |
| 7,363,644 B2 | 4/2008 | Wugofski |
| 7,584,214 B2 | 9/2009 | Narahara et al. ........... 707/104.1 |
| 7,596,761 B2 | 9/2009 | Lemay et al. ................. 715/779 |
| 7,669,219 B2 | 2/2010 | Scott, III |
| 7,673,315 B1 | 3/2010 | Wong et al. |
| 7,685,204 B2 | 3/2010 | Rogers |
| 7,698,263 B2 | 4/2010 | Pickelsimer et al. |
| 7,716,376 B1* | 5/2010 | Price et al. ..................... 709/248 |
| 7,877,293 B2 | 1/2011 | Biebesheimer et al. |
| 7,886,327 B2 | 2/2011 | Stevens |
| 7,895,625 B1 | 2/2011 | Bryan et al. |
| 7,904,924 B1 | 3/2011 | de Heer et al. |
| 7,933,789 B2 | 4/2011 | Boland et al. |
| 7,992,163 B1 | 8/2011 | Jerding et al. |
| 8,090,606 B2 | 1/2012 | Svendsen |
| 8,091,032 B2 | 1/2012 | Fischer |
| 8,220,021 B1 | 7/2012 | Look et al. |
| 8,296,660 B2 | 10/2012 | Macadaan et al. |
| 8,296,803 B2 | 10/2012 | Yamaoka et al. |
| 8,364,013 B2 | 1/2013 | Nijim |
| 8,418,204 B2 | 4/2013 | Pickelsimer et al. |
| 8,789,102 B2 | 7/2014 | Pickelsimer et al. |
| 8,789,117 B2 | 7/2014 | Nijim |
| 8,806,532 B2 | 8/2014 | Pickelsimer et al. |
| 8,832,749 B2 | 9/2014 | Pickelsimer et al. |
| 8,869,191 B2 | 10/2014 | Pickelsimer et al. |
| 2001/0001160 A1 | 5/2001 | Shoff et al. |
| 2001/0037367 A1 | 11/2001 | Iyer |
| 2002/0007485 A1 | 1/2002 | Rodriguez et al. |
| 2002/0056123 A1 | 5/2002 | Liwerant et al. |
| 2002/0057297 A1 | 5/2002 | Grimes et al. |
| 2002/0069218 A1 | 6/2002 | Sull et al. |
| 2002/0087982 A1 | 7/2002 | Stuart .......................... 725/539 |
| 2002/0120757 A1 | 8/2002 | Sutherland et al. |
| 2002/0124252 A1 | 9/2002 | Schaefer et al. |
| 2002/0128831 A1 | 9/2002 | Ju et al. |
| 2002/0144273 A1 | 10/2002 | Reto |
| 2002/0156852 A1* | 10/2002 | Hughes et al. ................ 709/206 |
| 2002/0174430 A1 | 11/2002 | Ellis et al. |
| 2002/0194195 A1 | 12/2002 | Fenton et al. ............. 707/104.1 |
| 2002/0199188 A1 | 12/2002 | Sie et al. |
| 2003/0002849 A1 | 1/2003 | Lord |
| 2003/0021582 A1 | 1/2003 | Sawada |
| 2003/0084449 A1 | 5/2003 | Chane et al. |
| 2003/0093790 A1* | 5/2003 | Logan et al. ................... 725/38 |
| 2003/0093806 A1* | 5/2003 | Dureau et al. ................ 725/107 |
| 2003/0112467 A1 | 6/2003 | McCollum et al. |
| 2003/0115592 A1 | 6/2003 | Johnson |
| 2003/0154477 A1 | 8/2003 | Hassell et al. |
| 2003/0156827 A1 | 8/2003 | Janevski |
| 2003/0177497 A1 | 9/2003 | Macrae et al. |
| 2003/0206710 A1 | 11/2003 | Ferman et al. |
| 2003/0208763 A1 | 11/2003 | McElhatten et al. |
| 2003/0220100 A1 | 11/2003 | McElhatten et al. |
| 2003/0225846 A1* | 12/2003 | Heikes et al. ................. 709/207 |
| 2003/0229900 A1 | 12/2003 | Reisman |
| 2004/0034867 A1 | 2/2004 | Rashkovskiy et al. .......... 725/40 |
| 2004/0060063 A1 | 3/2004 | Russ et al. |
| 2004/0064835 A1 | 4/2004 | Bellwood et al. |
| 2004/0078807 A1 | 4/2004 | Fries et al. |
| 2004/0078814 A1 | 4/2004 | Allen |
| 2004/0103167 A1 | 5/2004 | Grooters et al. |
| 2004/0117786 A1 | 6/2004 | Kellerman et al. |
| 2004/0210928 A1 | 10/2004 | Hamzy et al. |
| 2004/0255336 A1 | 12/2004 | Logan et al. .................. 725/135 |
| 2004/0255340 A1 | 12/2004 | Logan |
| 2004/0268386 A1 | 12/2004 | Logan et al. |
| 2005/0022241 A1 | 1/2005 | Griggs |
| 2005/0028208 A1 | 2/2005 | Ellis et al. |
| 2005/0044565 A1 | 2/2005 | Jerding et al. |
| 2005/0055710 A1 | 3/2005 | Aoki et al. |
| 2005/0076363 A1 | 4/2005 | Dukes et al. |
| 2005/0091316 A1 | 4/2005 | Ponce et al. |
| 2005/0149880 A1 | 7/2005 | Postrel |
| 2005/0210145 A1 | 9/2005 | Kim et al. |
| 2005/0246739 A1 | 11/2005 | Davidson |
| 2005/0251820 A1 | 11/2005 | Stefanik et al. |
| 2005/0262542 A1 | 11/2005 | DeWeese et al. |
| 2005/0278443 A1 | 12/2005 | Winner et al. |
| 2005/0278740 A1 | 12/2005 | Helms ............................. 725/41 |
| 2005/0278761 A1 | 12/2005 | Gonder et al. |
| 2005/0283813 A1 | 12/2005 | Jamail et al. |
| 2006/0005207 A1 | 1/2006 | Louch et al. |
| 2006/0020904 A1 | 1/2006 | Aaltonen et al. |
| 2006/0031882 A1 | 2/2006 | Swix et al. |
| 2006/0041927 A1 | 2/2006 | Stark et al. .................... 725/139 |
| 2006/0059514 A1 | 3/2006 | Hsiao et al. |
| 2006/0059526 A1 | 3/2006 | Poslinski |
| 2006/0075019 A1 | 4/2006 | Donovan et al. |
| 2006/0080408 A1 | 4/2006 | Istvan et al. .................... 709/219 |
| 2006/0090183 A1 | 4/2006 | Zito et al. |
| 2006/0112325 A1 | 5/2006 | Ducheneaut et al. |
| 2006/0130093 A1 | 6/2006 | Feng et al. |
| 2006/0143236 A1 | 6/2006 | Wu |
| 2006/0161950 A1* | 7/2006 | Imai et al. ...................... 725/46 |
| 2006/0174277 A1 | 8/2006 | Sezan et al. |
| 2006/0184972 A1 | 8/2006 | Rafey et al. |
| 2006/0190966 A1 | 8/2006 | McKissick et al. |
| 2006/0195479 A1 | 8/2006 | Spiegelman et al. |
| 2006/0248557 A1 | 11/2006 | Stark et al. .................... 725/37 |
| 2006/0253874 A1 | 11/2006 | Stark et al. .................... 725/62 |
| 2006/0259926 A1 | 11/2006 | Scheelke et al. |
| 2006/0271959 A1 | 11/2006 | Jacoby et al. |
| 2006/0282856 A1 | 12/2006 | Errico et al. |
| 2007/0033533 A1 | 2/2007 | Sull |
| 2007/0061835 A1 | 3/2007 | Klein et al. |
| 2007/0106627 A1 | 5/2007 | Srivastava et al. |
| 2007/0123353 A1 | 5/2007 | Smith |
| 2007/0124795 A1 | 5/2007 | McKissick et al. |
| 2007/0150918 A1 | 6/2007 | Carpenter et al. |
| 2007/0186180 A1 | 8/2007 | Morgan |
| 2007/0186231 A1 | 8/2007 | Haeuser et al. |
| 2007/0186243 A1 | 8/2007 | Pettit et al. |
| 2007/0198532 A1* | 8/2007 | Krikorian et al. ............... 707/10 |
| 2007/0204238 A1 | 8/2007 | Hua et al. |
| 2007/0214473 A1 | 9/2007 | Barton et al. |
| 2007/0220552 A1 | 9/2007 | Juster et al. |
| 2007/0220566 A1 | 9/2007 | Ahmad-Taylor |
| 2007/0245367 A1 | 10/2007 | Ogawa |
| 2007/0256103 A1 | 11/2007 | Knudson |
| 2007/0271338 A1* | 11/2007 | Anschutz ....................... 709/204 |
| 2007/0277205 A1 | 11/2007 | Grannan |
| 2007/0282949 A1 | 12/2007 | Fischer et al. |
| 2007/0294726 A1 | 12/2007 | Drazin |
| 2007/0298401 A1 | 12/2007 | Mohanty et al. |
| 2008/0010153 A1 | 1/2008 | Pugh-O'Connor et al. |
| 2008/0022320 A1 | 1/2008 | Ver Steeg |
| 2008/0036917 A1 | 2/2008 | Pascarella et al. |
| 2008/0040370 A1 | 2/2008 | Bosworth et al. |
| 2008/0052371 A1 | 2/2008 | Partovi et al. |
| 2008/0065758 A1* | 3/2008 | Narayanaswami ........... 709/224 |
| 2008/0066111 A1 | 3/2008 | Ellis et al. |
| 2008/0066114 A1* | 3/2008 | Carlson et al. ................ 725/61 |
| 2008/0082606 A1 | 4/2008 | Gupta et al. |
| 2008/0086456 A1 | 4/2008 | Rasanen et al. |
| 2008/0092168 A1 | 4/2008 | Logan et al. |
| 2008/0098323 A1 | 4/2008 | Vallone et al. |
| 2008/0114861 A1 | 5/2008 | Gildred |
| 2008/0126936 A1 | 5/2008 | Williams ......................... 715/17 |
| 2008/0155600 A1 | 6/2008 | Klappert et al. ............... 725/44 |

(56) References Cited

U.S. PATENT DOCUMENTS

| | | | |
|---|---|---|---|
| 2008/0163307 A1 | 7/2008 | Coburn et al. | 725/61 |
| 2008/0168515 A1 | 7/2008 | Benson et al. | |
| 2008/0177727 A1 | 7/2008 | Pickelsimer | |
| 2008/0178218 A1 | 7/2008 | Pickelsimer | |
| 2008/0235733 A1 | 9/2008 | Heie et al. | |
| 2008/0247730 A1 | 10/2008 | Barton et al. | |
| 2008/0263595 A1 | 10/2008 | Sumiyoshi et al. | 725/39 |
| 2008/0276278 A1 | 11/2008 | Krieger et al. | 725/40 |
| 2008/0288596 A1 | 11/2008 | Smith et al. | |
| 2008/0313541 A1 | 12/2008 | Shafton et al. | |
| 2008/0320139 A1 | 12/2008 | Fukuda et al. | |
| 2009/0019374 A1* | 1/2009 | Logan et al. | 715/753 |
| 2009/0044216 A1 | 2/2009 | McNicoll | |
| 2009/0049098 A1 | 2/2009 | Pickelsimer et al. | |
| 2009/0049118 A1 | 2/2009 | Stevens | |
| 2009/0049473 A1 | 2/2009 | Pickelsimer et al. | |
| 2009/0055743 A1 | 2/2009 | Pickelsimer et al. | |
| 2009/0055868 A1 | 2/2009 | Wehmeyer et al. | |
| 2009/0063994 A1 | 3/2009 | Pickelsimer et al. | |
| 2009/0094643 A1 | 4/2009 | Pickelsimer et al. | |
| 2009/0100469 A1 | 4/2009 | Conradt et al. | |
| 2009/0125843 A1 | 5/2009 | Billmaier et al. | |
| 2009/0172127 A1 | 7/2009 | Srikanth et al. | |
| 2009/0172543 A1 | 7/2009 | Cronin et al. | |
| 2009/0178081 A1 | 7/2009 | Goldenberg et al. | |
| 2009/0199242 A1 | 8/2009 | Johnson et al. | |
| 2009/0307719 A1 | 12/2009 | Clark et al. | |
| 2009/0310933 A1 | 12/2009 | Lee | |
| 2009/0313664 A1 | 12/2009 | Patil et al. | |
| 2010/0042746 A1 | 2/2010 | Keum et al. | |
| 2010/0064320 A1 | 3/2010 | Angiolillo et al. | |
| 2010/0107194 A1 | 4/2010 | McKissick et al. | |
| 2010/0175084 A1* | 7/2010 | Ellis et al. | 725/32 |
| 2010/0192173 A1 | 7/2010 | Mizuki et al. | |
| 2011/0010744 A1 | 1/2011 | Stecyk et al. | |
| 2011/0013885 A1* | 1/2011 | Wong et al. | 386/297 |
| 2011/0072455 A1 | 3/2011 | Pickelsimer et al. | |
| 2011/0090402 A1 | 4/2011 | Huntington et al. | |
| 2011/0107389 A1 | 5/2011 | Chakarapani | |
| 2011/0131600 A1 | 6/2011 | Howcroft et al. | |
| 2011/0138423 A1 | 6/2011 | Pickelsimer et al. | |
| 2011/0202945 A1 | 8/2011 | Pickelsimer et al. | |
| 2011/0283313 A1 | 11/2011 | Gathen et al. | |
| 2012/0051717 A1 | 3/2012 | Nijim | |
| 2012/0054808 A1 | 3/2012 | Nijim | |
| 2012/0054810 A1 | 3/2012 | Nijim | |
| 2012/0222056 A1 | 8/2012 | Donoghue et al. | |
| 2012/0284744 A1 | 11/2012 | Kumar | |
| 2013/0167168 A1 | 6/2013 | Ellis et al. | |

OTHER PUBLICATIONS

U.S. Final Office Action dated Dec. 30, 2009 cited in U.S. Appl. No. 11/787,732.
U.S. Appl. No. 11/787,732, filed Apr. 17, 2007 entitled "Providing a Video User Interface".
U.S. Appl. No. 11/787,733, filed Apr. 17, 2007 entitled "Providing a Lateral Search".
U.S. Appl. No. 12/126,025, filed May 23, 2008 entitled "Providing a Video User Interface".
U.S. Appl. No. 12/126,060, filed May 23, 2008 entitled "Providing a Social Network".
U.S. Appl. No. 12/126,126, filed May 23, 2008 entitled "Providing a User Interface".
U.S. Office Action dated Jun. 22, 2009 cited in U.S. Appl. No. 11/787,732.
J. Bouwen et al., "Communication Meets Entertainment: Community Television," Technology White Paper, Alcatel Telecommunications Review, 1$^{st}$ Quarter 2005, pp. 1-8, http://www.alcatel.com/doctypes/articlepaperlibrary/pdf/ATR2005Q1/T0503-Community_TV-EN.pdf.
U.S. Appl. No. 12/126,096, filed May 23, 2008 entitled "Providing a Content Mark".
U.S. Appl. No. 12/126,165, filed May 23, 2008 entitled "Providing a Customized User Interface".
U.S. Office Action dated Apr. 28, 2009 cited in U.S. Appl. No. 11/787,733.
Copending U.S. Appl. No. 12/868,801, filed Aug. 26, 2010 entitled "Content Library".
Copending U.S. Appl. No. 12/868,824, filed Aug. 26, 2010 entitled "Playlist Bookmarking".
Copending U.S. Appl. No. 12/868,838, filed Aug. 26, 2010 entitled "Content Bookmarking".
U.S. Office Action dated Sep. 14, 2010 cited in U.S. Appl. No. 11/787,732.
U.S. Office Action dated Sep. 30, 2010 cited in U.S. Appl. No. 12/126,165.
U.S. Office Action dated Oct. 5, 2010 cited in U.S. Appl. No. 12/126,096.
Copending U.S. Appl. No. 12/959,731, filed Dec. 3, 2010 entitled "Providing a Media Guide Including Parental Information".
Copending U.S. Appl. No. 12/959,665, filed Dec. 3, 2010 entitled "Content Recommendations".
Copending U.S. Appl. No. 12/959,793, filed Dec. 3, 2010 entitled "Personalizing TV Content".
U.S. Final Office Action dated Jan. 14, 2011 cited in U.S. Appl. No. 12/126,096.
U.S. Office Action dated Feb. 14, 2011 cited in U.S. Appl. No. 12/126,025.
U.S. Office Action dated Feb. 17, 2011 cited in U.S. Appl. No. 12/126,060.
U.S. Office Action dated Feb. 18, 2011 cited in U.S. Appl. No. 12/545,099.
U.S. Final Office Action dated Mar. 2, 2011 cited in U.S. Appl. No. 11/787,732.
U.S. Final Office Action dated Mar. 2, 2011 cited in U.S. Appl. No. 12/126,165.
U.S. Office Action dated Apr. 26, 2011 cited in U.S. Appl. No. 12/126,096.
U.S. Final Office Action dated Jun. 13, 2011 cited in U.S. Appl. No. 12/126,060.
U.S. Final Office Action dated Jun. 21, 2011 cited in U.S. Appl. No. 12/126,025.
U.S. Appl. No. 13/221,151, filed Aug. 30, 2011 entitled "Sharing Digitally Recorded Content".
U.S. Final Office Action dated Sep. 29, 2011 cited in U.S. Appl. No. 12/126,096.
U.S. Office Action dated Dec. 28, 2011 cited in U.S. Appl. No. 12/545,099, 13 pgs.
U.S. Office Action dated Jan. 5, 2012 cited in U.S. Appl. No. 12/126,096, 20 pgs.
U.S. Final Office Action dated Aug. 5, 2011 cited in U.S. Appl. No. 12/545,099.
U.S. Office Action dated Jan. 18, 2012 cited in U.S. Appl. No. 12/126,025, 27 pgs.
U.S. Office Action dated Jan. 19, 2012 cited in U.S. Appl. No. 12/126,165, 20 pgs.
U.S. Office Action dated Mar. 26, 2012 cited in U.S. Appl. No. 12/126,060, 26 pgs.
U.S. Final Office Action dated May 31, 2012 cited in U.S. Appl. No. 12/126,165, 23 pgs.
U.S. Office Action dated Jun. 5, 2012 cited in U.S. Appl. No. 12/126,126, 40 pgs.
U.S. Office Action dated Jun. 20, 2012 cited in U.S. Appl. No. 12/959,731, 30 pgs.
U.S. Final Office Action dated Aug. 15, 2012 cited in U.S. Appl. No. 12/126,025, 33 pgs.
U.S. Final Office Action dated Aug. 23, 2012 cited in U.S. Appl. No. 12/126,060, 30 pgs.
U.S. Final Office Action dated Aug. 29, 2012 cited in U.S. Appl. No. 12/868,838, 7 pgs.
U.S. Final Office Action dated Apr. 20, 2012 cited in U.S. Appl. No. 12/126,096, 25 pgs.
U.S. Final Office Action dated Apr. 25, 2012 cited in U.S. Appl. No. 12/545,099, 16 pgs.

(56) References Cited

OTHER PUBLICATIONS

U.S. Office Action dated May 21, 2012 cited in U.S. Appl. No. 12/868,838, 22 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Nov. 29, 2012 cited in U.S. Appl. No. 12/868,824, 33 pgs.
U.S. Office Action dated Dec. 19, 2012 cited in U.S. Appl. No. 12/126,025, 30 pgs.
U.S. Final Office Action dated Dec. 28, 2012 cited in U.S. Appl. No. 12/126,126, 24 pgs.
U.S. Office Action dated Oct. 4, 2012 cited in U.S. Appl. No. 12/868,801, 27 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Final Office Action dated Apr. 10, 2013 cited in U.S. Appl. No. 12/959,793, 23 pgs.
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 25, 2013 cited in U.S. Appl. No. 12/126,165, 26 pgs.
U.S. Final Office Action dated Apr. 30, 2013 cited in U.S. Appl. No. 12/868,801, 13 pgs.
U.S. Final Office Action dated May 3, 2013 cited in U.S. Appl. No. 12/545,099, 20 pgs.
U.S. Office Action dated May 14, 2013 cited in U.S. Appl. No. 12/868,824, 12 pgs.
U.S. Office Action dated Aug. 21, 2013 cited in U.S. Appl. No. 12/126,096, 23 pgs.
U.S. Office Action dated Sep. 9, 2013 cited in U.S. Appl. No. 13/221,151, 16 pgs.
U.S. Office Action dated Jun. 20, 2013 cited in U.S. Appl. No. 12/126,126, 27 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 16, 2013 cited in U.S. Appl. No. 12/868,801, 13 pgs.
U.S. Office Action dated Oct. 4, 2013 cited in U.S. Appl. No. 12/126,165, 28 pgs.
U.S. Office Action dated Oct. 7, 2013 cited in U.S. Appl. No. 12/959,793, 27 pgs.
U.S. Final Office Action dated Oct. 10, 2013 cited in U.S. Appl. No. 12/126,126, 23 pgs.
U.S. Office Action dated Oct. 29, 2013 cited in U.S. Appl. No. 12/126,060, 27 pgs.
U.S. Final Office Action dated Nov. 1, 2013 cited in U.S. Appl. No. 12/868,824, 15 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Final Office Action dated Apr. 3, 2014 cited in U.S. Appl. No. 12/126,060, 18 pgs.
U.S. Office Action dated May 20, 2014 cited in U.S. Appl. No. 12/126,096, 19 pgs.
U.S. Office Action dated May 21, 2014 cited in U.S. Appl. No. 13/221,151, 18 pgs.
U.S. Office Action dated Mar. 6, 2014 cited in U.S. Appl. No. 12/959,731, 16 pgs.
U.S. Office Action dated Mar. 21, 2014 cited in U.S. Appl. No. 12/868,824, 12 pgs.
U.S. Office Action dated Aug. 5, 2014 cited in U.S. Appl. No. 12/126,060, 23 pgs.
U.S. Final Office Action dated Aug. 27, 2014 cited in U.S. Appl. No. 12/126,096, 38 pgs.
U.S. Final Office Action dated Sep. 3, 2014 cited in U.S. Appl. No. 13/221,151, 31 pgs.
U.S. Final Office Action dated Sep. 24, 2014 cited in U.S. Appl. No. 12/868,824, 28 pgs.

* cited by examiner

PROVIDING USER COMMUNICATION

BACKGROUND

Service providers may deliver content to a user over a content delivery system. For example, conventional content delivery systems distribute the content to a first user and a second user independently. In other words, the first user may watch a sports program while the second user may simultaneously watch a video-on-demand program. Independent content use, however, does not create a socialized entertainment sense with the users. Consequently, the first user may be socially detached and isolated from the second user. Stated another way, the conventional content delivery system may present an impersonal and unsocial user experience.

SUMMARY OF THE INVENTION

Consistent with embodiments of the present invention, systems and methods are disclosed for providing user communication. First an invitation input may be received from a first user. The invitation input may comprise a recommendation to a second user to take an action regarding content to be delivered over a content delivery system. Then, the invitation input may be transmitted to the second user. Next, an acceptance input may be received from the second user. The acceptance input may comprise an acceptance to the invitation input. The acceptance input may then be transmitted to the first user in response to receiving the acceptance input.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
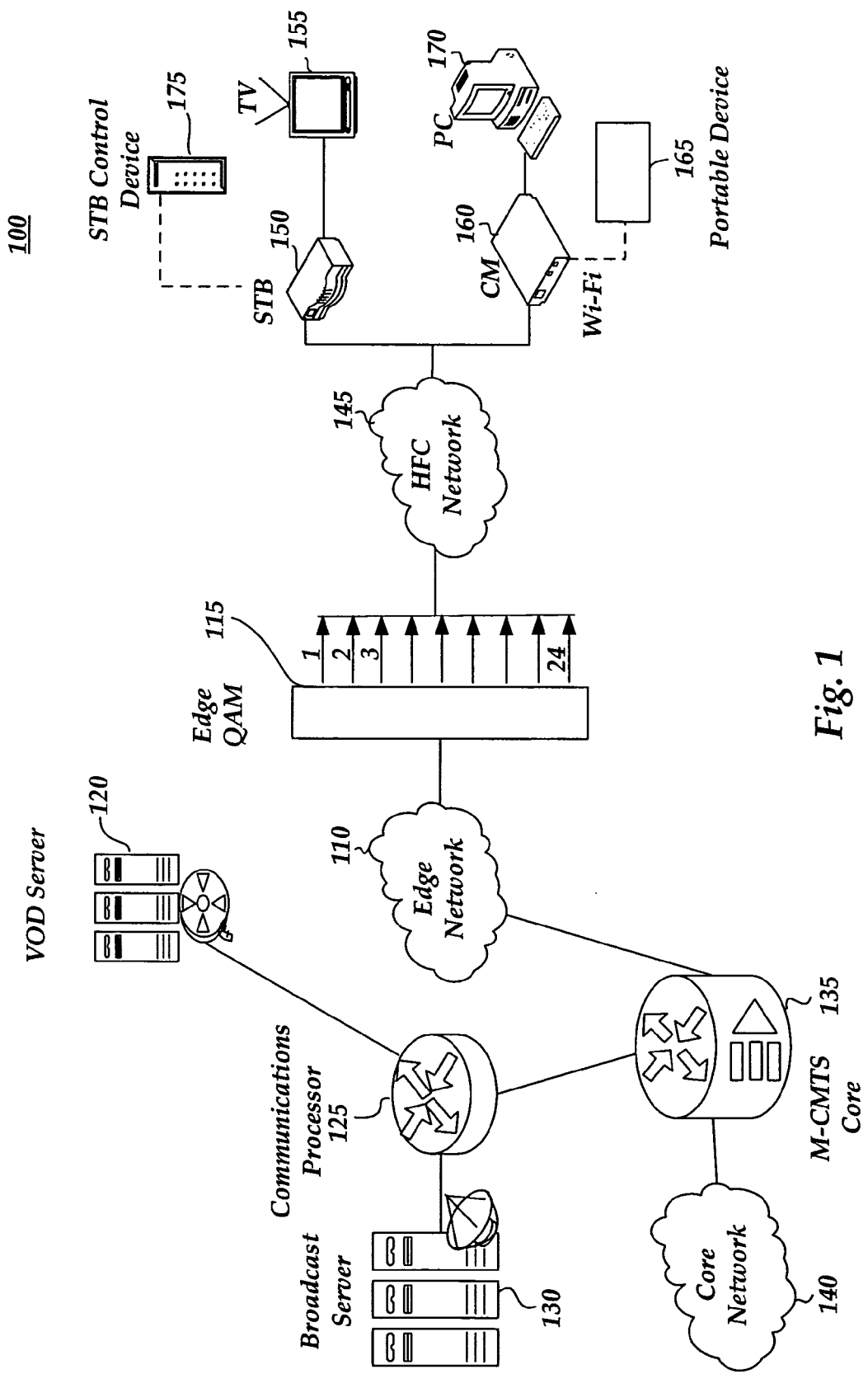
FIG. 1 is a block diagram of an operating environment including an application server.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system independently. For example, a first user may receive a sports program from the content delivery system while a second user may simultaneously receive a video-on-demand program from the content delivery system. Independent content use by the users, however, does not create a socialized entertainment experience. Consistent with embodiments of the invention, an invitation input may be received from the first user. The invitation input may comprise a recommendation to the second user to take an action regarding content to be delivered over the content delivery system. Then, the invitation input may be transmitted to the second user. Next, an acceptance input may be received from the second user. The acceptance input may comprise an acceptance to the invitation input. The acceptance input may then be transmitted to the first user in response to receiving the acceptance input. Consequently, the first user may be socially engaged with the second user providing a personalized experience for both the first and second users.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a communications processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television, a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150. For example, STB control device 175 may be a remote control for using STB 150. STB control device 175, after proper programming, may interface with STB 150.

Embodiments consistent with the invention may comprise a system for providing user communication. The system may comprise a memory storage and a processing unit coupled to the memory storage. The processing unit may be operative to receive an invitation input from a first user. The invitation input may comprise a recommendation to a second user to take an action regarding delivered content, delivered over a content delivery system. Furthermore, the processing unit may be operative to transmit the invitation input to the second user.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
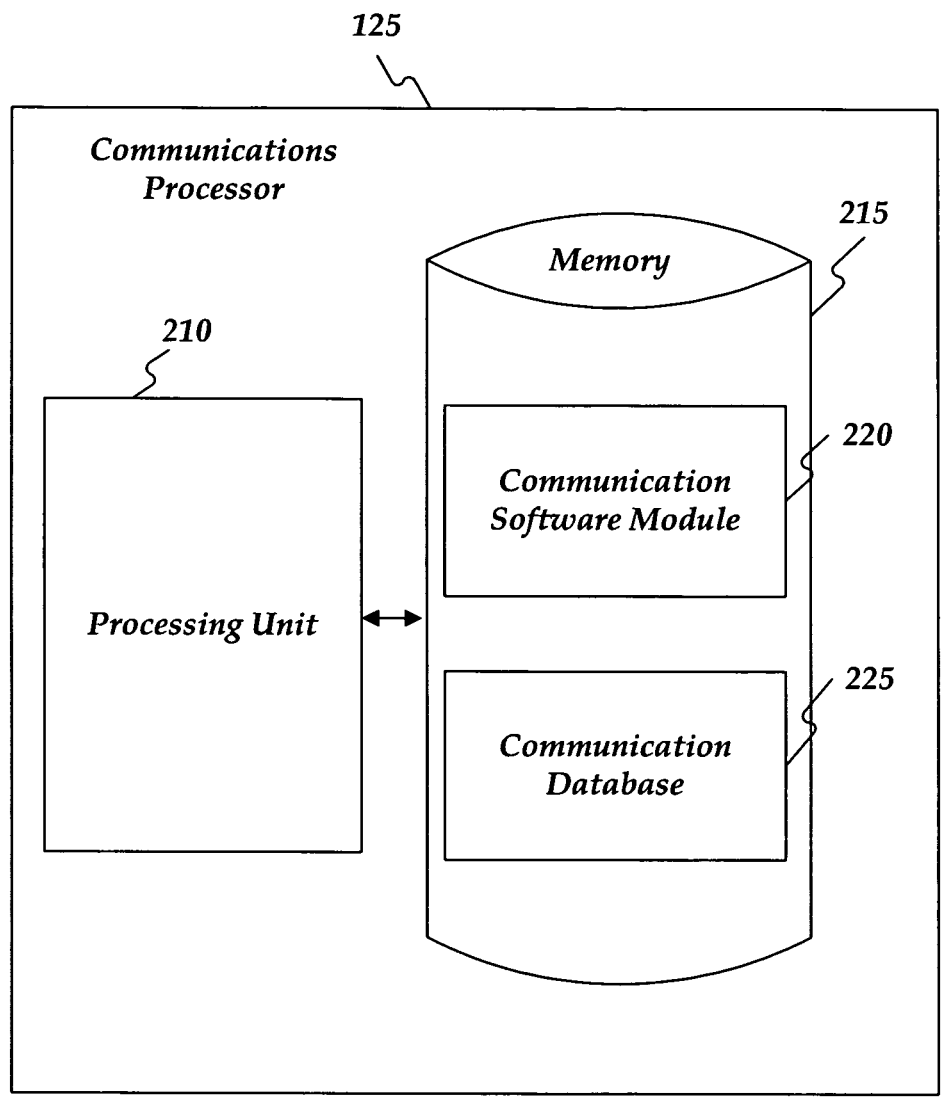
FIG. 2 is a block diagram of the communications processor.

FIG. 2 shows communications processor 125 of FIG. 1 in more detail. As shown in FIG. 2, communications processor 125 may include a processing unit 210 and a memory unit 215. Memory 215 may include a communication software module 220 and a communication database 225. While executing on processing unit 210, communication software module 220 may perform processes for providing user communication, including, for example, one or more stages included in method 300 or method 400 described below with respect to FIG. 3 and FIG. 4. Furthermore, any communication software module 220 and communication database 225 may be executed on or reside in any element shown in FIG. 1.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
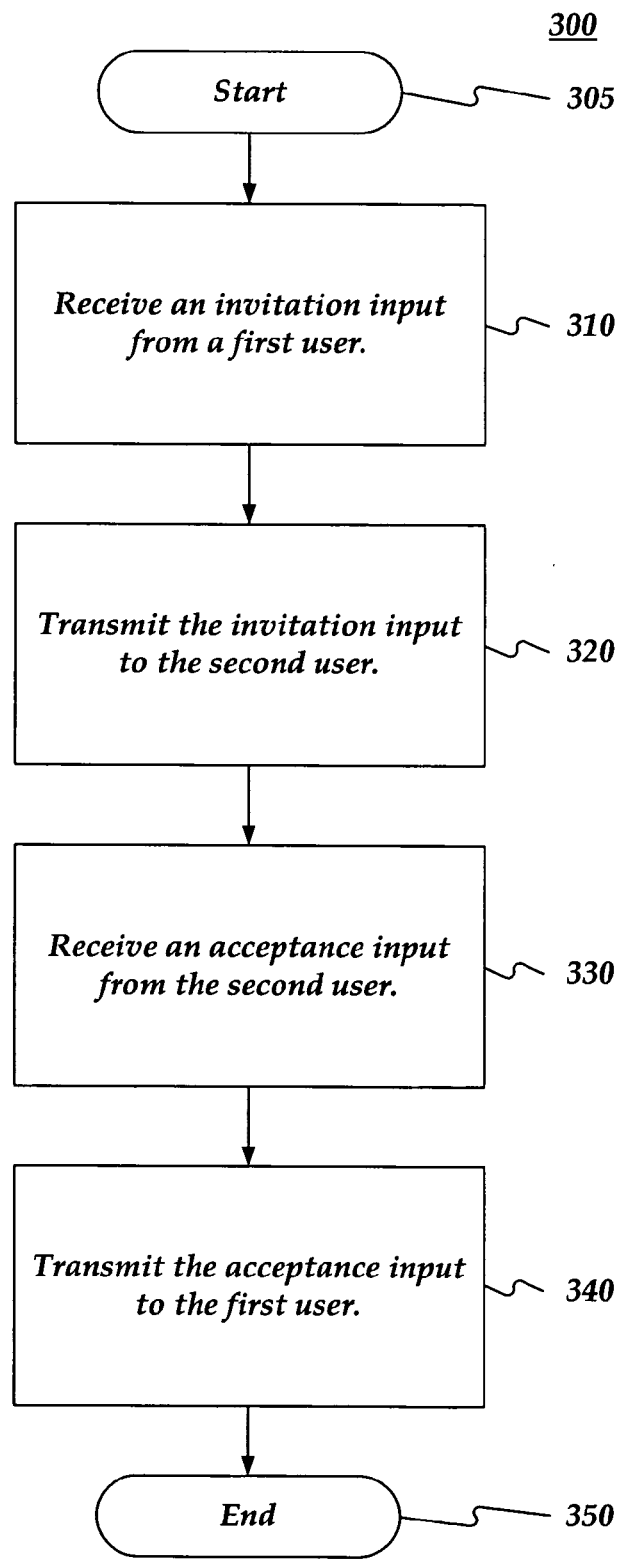
FIG. 3 is a flow chart of a method for providing user communication.

FIG. 3 is a flowchart setting forth the general stages involved in a method 300 consistent with an embodiment of the invention for providing user communication. Method 300 may be implemented using communications processor 125, as described above with respect to FIG. 2. Ways to implement the stages of method 300 will be described in greater detail below. Method 300 may begin at starting block 305 and proceed to stage 310 where communications processor 125 may receive an invitation input from a first user. The invitation input may comprise a recommendation to a second user to take an action regarding content to be delivered over content delivery system 100. For example, the invitation input may be created by the first user using a first user device. The first user device may comprise STB 150, CM 160, portable device 165, PC 170, or STB control device 175. When creating the invitation input, the first user may include, for example, an address identifying the second user. For example, the invitation input may include a second user's username, a second user's control device identification, a second user's account number, or a second user's e-mail address. The aforementioned are examples and the address identifying the second user may comprise other information and the first user device may comprise other elements.

Furthermore, as stated above, the invitation input may comprise the recommendation to the second user to take the action regarding the content to be delivered over a content delivery system 100. For example, the first user may include a recommendation to the second user to view a program. In addition, the recommendation may comprise a recommendation to jump to the program, a recommendation to record the program, or a reminder regarding the program. The first user may also include an attachment with the invitation input. The attachment may contain, for example, a portion of the content, a text message, a user content rating, related program information, a pointer to a specific location within content stored or to be stored at a memory location in VOD server 120, set-top 150, television 155, cable modem 160, personal computer 170, or portable device 165, or a computer file. Moreover, the invitation input may comprise instructions for handling the message including, for example, a date to send the invitation input or a time to send the invitation input.

From stage 310, where communications processor 125 receives the invitation input from the first user, method 300 may advance to stage 320 where communications processor 125 may transmit the invitation input to the second user. For example, communications processor 125 may parse the invitation input for the address for the second user or may obtain the address for the second user in any manner. Once communications processor 125 has the address for the second user, communications processor 125 may transmit the invitation input to the second user through system 100. Communications processor 125 may store the invitation input for later retrieval. Furthermore, communications processor 125 may redirect the invitation input to another system, for example, an Ethernet data system or the Internet.

Communications processor 125 may transmit the invitation input to the second user device. For example, the address for the second user may correspond to the second user device, a memory location in the second user device, or a file storage folder within the second user device. The second user device may comprise STB 150, CM 160, portable device 165, PC 170, or STB control device 175. Communications processor 125 may perform processing on the invitation input, including aggregating with other invitation inputs, system data, and data from other system users. The invitation input may be viewed on the second user device by the second user. The second user may choose to ignore the invitation input, may delay responding to the invitation input, or may immediately respond to the invitation input.

From stage 320, where communications processor 125 transmits the invitation input to the second user, method 300 may advance to stage 330 where communications processor 125 may receive an acceptance input from the second user. For example, in response to receiving the invitation input, the second user may consider the invitation input and enter the acceptance input into the second user device. The acceptance input may be in response to the invitation input. For example, the second user may respond to the invitation input by rejecting the invitation input, postponing the invitation input, storing the invitation input for later retrieval, or sending a different content recommendation to the first user. The acceptance input may be transmitted from the second user device through system 100 or any other system. The acceptance input from the second user may not necessarily be a function of system 100. System 100 may be built so that the second user may receive the invitation input and take autonomous action on any recommendation or other element attached to the invitation input without notification being given to the first user.

From stage 330, where communications processor 125 receives the acceptance input from the second user, method 300 may advance to stage 340 where communications processor 125 may transmit the acceptance input to the first user. For example, communications processor 125 may transmit the acceptance input to the first user through system 100 or any other system. The first user may receive the acceptance input on the first user device. For example, the first user may receive the acceptance input on the first user device while viewing content on the first user device. In response to the acceptance input, the first user may have the option, for example, to accept a different content recommendation, reject a different content recommendation, or join in a shared viewing session with the second user.

Figure 4:
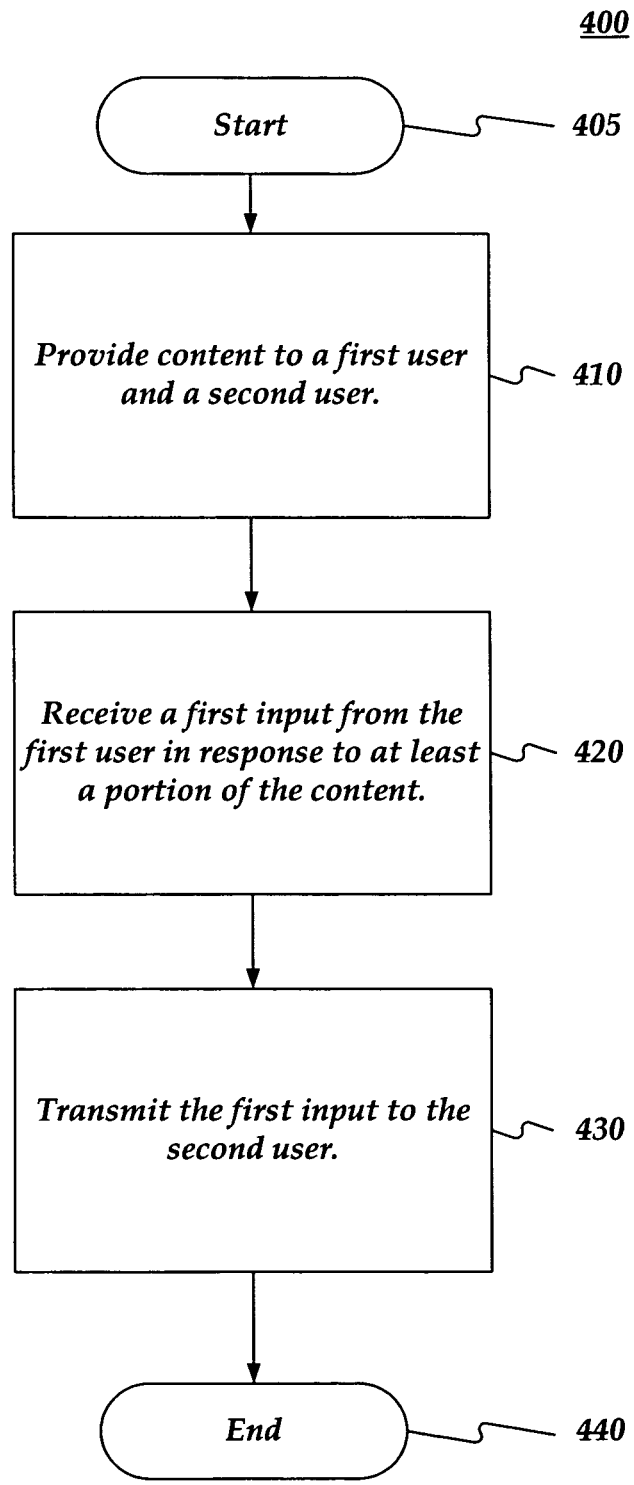
FIG. 4 is a flow chart of another method for providing user communication.

FIG. 4 is a flowchart setting forth the general stages involved in a method 400 consistent with embodiments of the invention for providing user communication. Method 400 may be implemented using communications processor 125, as described above in more detail with respect to FIG. 2. Ways to implement method 400's stages will be described in greater detail below. Method 400 may begin at starting block 405 and proceed to stage 410 where system 100 may provide content to a first user and a second user. The first user and the second user may receive and view the content on, for example, STB 150, CM 160, portable device 165, PC 170, or STB control device 175. The first user and the second user may view the same content substantially simultaneously and remotely.

From stage 410, where system 100 provides content to the first user and the second user, method 400 may advance to stage 420 where communications processor 125 may receive (e.g. over system 100) a first input from the first user in response to at least a portion of the content. The first input may be selected from an input set. The first user may define the input set using a portion of a plurality of selectable elements. Furthermore, the first input may include, for example, a login name, password and a username. The first user may assign a key from, for example, the keys on the first user device (e.g. STB control device 175) to elements within the input set. This may allow the first user to select from the input set. The input set may include, for example, a personal expression. The personal expression may be an alphanumeric input entered using keys from the first user device. The keys may have multiple alphanumeric meanings. Furthermore, the input set may include emotional icons, alphanumeric shorthand text, avatars, sound bites, video clips, or text words. In addition, the first user may input new text words for the first user's input set. The first user or communications processor 125 may input the username in as an element of the input set. The first user may transmit the first input by selecting the appropriately assigned key from STB control device 175.

Furthermore, the first input may comprise an invitation input to the second user for the second user to interact contemporaneously with the first user regarding at least a portion of the content. The invitation input may include an address of the second user. The address may comprise a username of the second user, a service location of the second user, a system identification of the second user, an e-mail address of the second user, or an account number of the second user. Furthermore, the invitation input may include a request to allow the first user to add the second user to the first user's input set. In addition, the invitation input may include a content recommendation, a content tuning instruction, a selected portion of the content, a pointer to a specific location within content stored or to be stored at a memory location in VOD server 120, set-top 150, television 155, cable modem 160, personal computer 170, or portable device 165, a computer file, a message to the second user, or a content recording instruction.

For example, the first user, after selecting the first user's username to enter the system, may enter the second user's account number to send the invitation input to the second user. Furthermore, the first user may select a content recommendation selection. The invitation input may be transmitted over system 100 to communications processor 125. Communications processor 125 may direct the invitation input to the second user.

From stage 420, where communications processor 125 receives the first input from the first user, method 400 may advance to stage 430 where communications processor 125 may transmit the first input to the second user. For example, the first input may be transmitted to the second user device over system 100 or any other system. Furthermore, communications processor 125 may store the first input for later transmission if, for example, the second user is not available or has temporarily blocked transmission of the first input. For example, if the second user has a block future input selection selected, communications processor 125 may store the first input and try to transmit later.

The second user may receive the first input where the first input may include the invitation input. The second user may receive the invitation input while viewing content different from the first user's viewed content. The invitation input may display on TV 155, for example, or any other device. The second user may accept the invitation input, deny the invitation input, send an instruction to ignore the invitation input, send the instruction to block future invitation input from the first user, store the invitation input for later retrieval, or send a text message to the first user regarding the invitation input. The second user may use the second user device to respond to the invitation input. For example, while watching a football game, the second user may receive, for example, the invitation input with a request to watch a movie from the first user. The second user may then accept the invitation by pressing a button on STB control device 175. By accepting the invitation, the second user's content may change to the content recommendation sent by the first user.

Upon accepting the invitation input, the second user may transmit an acceptance input to the first user. The acceptance input may include information about the second user's selections regarding the invitation input. The acceptance input may include input from the second user's input set. For example, after accepting the invitation, STB 150 of the second user may transmit an acceptance input. The acceptance input may include a confirmation that the second user's content matches the first user's content. In addition, the second user may select to include a text message and a representative avatar from the second user's input set as an attachment.

The first user may receive the acceptance input, the attached confirmation, and the text message. The first user may select a representative avatar from the first user's input set and transmit the selection to the second user. Once communications processor 125 transmits the first input to the second user in stage 430, method 400 may then end at stage 440.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing user communication, the method comprising:
   receiving, at a communication processor, in response to a selection of a key on a remote control device associated with the first user, one of a set of commands for transmitting an invitation input from the first user to a second user, wherein the set of commands is defined by the first user using a portion of a plurality of selectable elements, wherein each of the set of commands is assigned an unique key on the remote control device, wherein the invitation input comprising a recommendation to a second user to take an action regarding content being provided to the first user, the recommendation comprising an attachment having a portion of the content and a pointer to a specific location within the content, wherein the invitation input further comprising instructions for the communication processor for processing the invitation input, the instructions comprising an address and a date and a time to deliver the invitation input to the second user;
   processing, by the communication processor, the invitation input, wherein processing the invitation input comprises:
   storing the invitation input for later retrieval, at the communication processor, based on the date and time to deliver the invitation input, and
   determining a status of the second user, wherein determining the status comprises determining whether the second user is available to receive the invitation input; wherein determining whether the second user is available to receive the invitation input comprises determining whether the second user has blocked the first user, and storing the invitation input, in response to the second user blocking the first user, for later retrieval; and
   transmitting the invitation input to the second user based on the determined status.

2. The method of claim 1, wherein receiving the invitation input comprises receiving the invitation input over a content delivery system.

3. The method of claim 1, wherein receiving the invitation input comprises receiving the invitation input from a first user device comprising one of the following: a network interface unit, a residential gateway, a set-top box, a terminal unit, a scrambler/descrambler, a digital storage media unit, a control device, a television, an LCD screen, a cable modem, a computer, and a projection unit.

4. The method of claim 1, wherein receiving the invitation input from the first user, the invitation input comprising the recommendation, comprises receiving the invitation input from the first user, the invitation input comprising the recommendation comprising at least one of the following: a recommendation to view a program, a recommendation to jump to the program, a recommendation to record the program, and a reminder regarding the program.

5. The method of claim 1, wherein receiving the invitation input from the first user, the invitation input comprising the recommendation to the second user to take the action regarding the content to be delivered, comprises receiving the invitation input from the first user, the invitation input comprising the recommendation to the second user to take the action regarding the content to be delivered over a content delivery system comprising one of the following: a full-duplex, two-way broadband network, a hybrid fiber-coax (HFC) network, a data network, the internet, cable television network, and a telecommunications network.

6. The method of claim 1, wherein receiving the invitation input from the first user, the invitation input comprising the recommendation to the second user to take the action regarding the content to be delivered, comprises receiving the invitation input from the first user, the invitation input comprising the recommendation to the second user to take the action regarding the content comprising one of the following: a broadcast multimedia service, a high-definition multimedia service, a digital television multimedia service, an analog multimedia service, a Video-on-Demand service, a streaming video, a multimedia messaging service, a voice over IP service, an interactive multimedia service, and an e-mail service.

7. The method of claim 1, wherein transmitting the invitation input comprises transmitting the invitation input over a content delivery system.

8. The method of claim 1, wherein transmitting the invitation input comprises transmitting the invitation input from a second user device.

9. The method of claim 1, wherein transmitting the invitation input comprises transmitting the invitation input to a second user device comprising one of the following: a network interface unit, a residential gateway, a set-top box, a terminal unit, a scrambler/descrambler, a digital storage media unit, a control device, a television, an LCD screen, a cable modem, a computer, and a projection unit.

10. The method of claim 1, wherein transmitting the invitation input comprises transmitting the invitation input to a second user device configured to store the invitation input in a database associated with the second user.

11. The method of claim 1, further comprising:
receiving an acceptance input from the second user, the acceptance input comprising an acceptance to the invitation input; and
transmitting the acceptance input to the first user in response to receiving the acceptance input.

12. The method of claim 1, wherein determining whether the second user is available to receive the invitation input comprises determining whether the second user is not available to accept the invitation input, and wherein transmitting the invitation input comprises transmitting the invitation input, in response to the second user not being available, to an alternate address associated with the second user.

13. A method for providing user communication, the method comprising:
providing content to a first user and a second user;
receiving a first input from the first user, the first input being selected by the first user from a button on a remote control, the button on the remote control being configured to trigger one of a set of commands for transmitting an invitation input to a second user, the set of commands being predefined by the first user using a portion of a plurality of selectable elements, the set of commands associated with communicating information regarding the content being provided to the first user at a time the first input is received from the first user, wherein each one of the set of commands is assigned an unique key on the remote control device, wherein receiving the invitation input from the first user comprises receiving an attachment with the invitation input, and wherein the attachment comprises a portion of the content and a pointer to a specific location within the content, wherein the invitation input further comprising instructions for a communication processor for handling the invitation input, the instructions comprising an address for the second user, and a date and a time to deliver the invitation input to the second user;
processing, by the communication processor, the invitation input, wherein processing the invitation input comprises:
storing the invitation input for later retrieval, at the communication processor, based on the date and time to deliver the invitation input, and determining a status of the second user, wherein determining the status comprises determining whether the second user is available to receive the invitation input; wherein determining whether the second user is available to receive the invitation input comprises determining whether the second user has blocked the first user, and storing the invitation input, in response to the second user blocking the first user, for later retrieval; and
requesting permission from the second user to add the second user to the first user's input set.

14. The method of claim 13, further comprising:
receiving the invitation input from the first user, the invitation input comprising an invitation from the first user to the second user for the second user to interact contemporaneously with the first user in response to at least the portion of the content;
transmitting the invitation input to the second user;
receiving an acceptance input from the second user, the acceptance input comprising an acceptance to the invitation; and
transmitting the acceptance input to the first user in response to receiving the acceptance input.

15. The method of claim 14, wherein receiving the invitation input from the first user, the invitation input comprising the invitation, further comprises receiving the invitation input from the first user wherein the invitation comprises at least one of the following: a username of the second user, a service location of the second user, a system identification of the second user, an e-mail address of the second user, and an account number of the second user.

16. The method of claim 14, wherein receiving the invitation input from the first user further comprises receiving the invitation input comprising at least one of the following: a request to the second user for the second user to be added to the first user's input set, a content recommendation, a content tuning instruction, a message, and a content recording instruction.

17. The method of claim 13, wherein receiving the first input comprises receiving the first input wherein at least one of the plurality of selectable elements corresponds to a personal expression.

18. The method of claim 13, wherein receiving the first input comprises receiving the first input wherein the at least one of the plurality of selectable elements comprises at least one of the following: an emotional icon, an alphanumeric shorthand text, and an avatar.

19. A system for providing user communication, the system comprising:
a memory storage; and
a processing unit coupled to the memory storage, wherein the processing unit is operative to:
provide content to a first user;
receive an input from the first user, the input being associated with a button on a remote control, the button being configured to activate one of a plurality of input commands for transmitting an invitation input to a second user, the plurality of input commands defined by the first user using a portion of a plurality of selectable elements, the plurality of input commands being associated with transmitting information associated with the content provided to the first user at a time the input from the first user is received, wherein each of the plurality of input commands is assigned an unique key on the remote control device;
activate, in response to receiving the first input, an input set associated with transmitting the invitation input from the first user to a second user defined by the input set, the input set comprising an input of a username, a password, a message, and at least one recipient, the invitation input comprising a recommendation to a second user to take an action regarding the content to be delivered over a content delivery system, the recommendation comprising an attachment having a portion of the content and a pointer to a specific location within the content;
process the invitation input, wherein processing the invitation input comprises:
storing the invitation input for later retrieval, at the communication unit, based on the date and time to deliver the invitation input, and
determining a status of the second user, wherein determining the status comprises determining whether the second user is available to receive the invitation input; wherein determining whether the second user is available to receive the invitation input comprises determining whether the second user has blocked the first user, and storing the invitation input, in response to the second user blocking the first user, for later retrieval;

attach the content to be delivered to the invitation input; and transmit a request for permission from the second user to add the second user as contact of the first user's input set.

* * * * *